(12) United States Patent
Mo et al.

(10) Patent No.: US 9,980,502 B2
(45) Date of Patent: May 29, 2018

(54) CHEWING GUM CONTAINING A CROSS-LINKED GELATIN MATRIX GUM BASE

(75) Inventors: Xiaoqun Mo, Oak Park, IL (US); Jingping Liu, Indian Head Park, IL (US); Minmin Tian, Naperville, IL (US); Julie Hassler, Chicago, IL (US); Michael J Greenberg, Northbrook, IL (US)

(73) Assignee: Wm. Wrigley Jr. Company, Chicago, IL (US)

( * ) Notice: Subject to any disclaimer, the term of this patent is extended or adjusted under 35 U.S.C. 154(b) by 337 days.

(21) Appl. No.: 13/808,282

(22) PCT Filed: Jun. 30, 2011

(86) PCT No.: PCT/US2011/042642
§ 371 (c)(1),
(2), (4) Date: Jan. 4, 2013

(87) PCT Pub. No.: WO2012/006218
PCT Pub. Date: Jan. 12, 2012

(65) Prior Publication Data
US 2013/0108733 A1 May 2, 2013

Related U.S. Application Data

(60) Provisional application No. 61/362,473, filed on Jul. 8, 2010.

(51) Int. Cl.
| A23G 4/08 | (2006.01) |
| A23G 4/06 | (2006.01) |
| A23G 4/10 | (2006.01) |
| A23G 4/14 | (2006.01) |

(52) U.S. Cl.
CPC ............... *A23G 4/08* (2013.01); *A23G 4/06* (2013.01); *A23G 4/10* (2013.01); *A23G 4/14* (2013.01)

(58) Field of Classification Search
CPC ... A23G 4/06; A23G 4/08; A23G 4/10; A23G 4/14
See application file for complete search history.

(56) References Cited

U.S. PATENT DOCUMENTS

| 3,674,500 A | 7/1972 | Nagasawa et al. |
| 4,386,106 A | 5/1983 | Merritt et al. |
| 4,780,324 A | 10/1988 | Knebl et al. |
| 4,786,722 A | 11/1988 | Zehner |
| 4,931,294 A | 6/1990 | Yatka et al. |
| 5,236,719 A | 8/1993 | Meyers et al. |
| 5,279,847 A | 1/1994 | Okonogi et al. |
| 5,286,501 A | 2/1994 | Song et al. |
| 5,342,631 A | 8/1994 | Yatka et al. |
| 5,397,579 A * | 3/1995 | Yatka et al. ............ 426/3 |
| 5,409,719 A | 4/1995 | Cain et al. |
| 5,431,929 A | 7/1995 | Yatka et al. |
| 5,458,892 A | 10/1995 | Yatka et al. |
| 5,580,590 A | 12/1996 | Hartman |
| 5,882,702 A | 3/1999 | Abdel-Malik et al. |
| 5,972,406 A | 10/1999 | Urry et al. |
| 6,511,679 B2 | 1/2003 | D'Amelia et al. |
| 6,805,894 B1 | 10/2004 | Kimura et al. |
| 2008/0008742 A1 | 1/2008 | Cherukuri |
| 2009/0214445 A1 | 5/2009 | Boghani et al. |
| 2009/0258108 A1 | 10/2009 | Shen et al. |
| 2010/0119664 A1 | 5/2010 | Stawski |

FOREIGN PATENT DOCUMENTS

| EP | 0123742 B1 | 11/1984 | |
| EP | 0547658 A1 | 6/1993 | |
| EP | 0758528 A1 | 2/1997 | |
| EP | 1216621 A1 | 6/2002 | |
| EP | 1327441 A1 | 7/2003 | |
| IN | 05597DN2006 A | 8/2007 | |
| JP | 63-007747 A | 1/1988 | |
| JP | 63007747 A2 | 1/1988 | |
| JP | 1991-297352 A | 12/1991 | |
| JP | 03297352 A * | 12/1991 | ............... A23G 3/30 |
| JP | 2000-189060 A | 7/2000 | |
| JP | 2000189060 A * | 7/2000 | ............... A23G 3/30 |
| JP | 2001-008634 A | 1/2001 | |
| JP | 2001008634 A | 1/2001 | |
| JP | 2006211929 A | 8/2006 | |
| JP | 2007-89579 A | 4/2007 | |

(Continued)

OTHER PUBLICATIONS

Strauss et al., Plant Phenolics as Cross-Linkers of Gelatin Gels and Gelatin-Based Coacervates for Use as Food Food Ingredients, Hyrocolloids, Jan. 2004, vol. 18, No. 1, pp. 81-89.

Gomez-Guillen et al., Edible Films Made From Tuna-Fish Gelatin With Antioxidant Extracts of Two Different Murta Ecotypes Leaves (Ugni Molinae Turcz), Food Hydrocolloids, Oct. 2007, vol. 21, No. 7, pp. 1133-1143.

George Strauss, Suzanne M. Gibson, Plant Phenolics as Cross-Linkers of Gelatin Gels and Gelatin-Based Coacervates for Use as Food Ingredients, Food Hydrocolloids, 18, Feb. 2, 2003, (2004) 81-89, Piscataway, NJ.

M.C. Gomez-Guillen, M. IHL, V. Bifani, A. Silva, P. Montero, Edible Films Made From Tuna-Fish Gelatin With Antioxidant Extracts of Two Different Murta Ecotypes Leaves (Ugni molinae Turcz), Food Hydrocolloids, 21, Aug. 4, 2007, 1133-1143, Madrid, Spain (Continued)

*Primary Examiner* — Nikki H. Dees
(74) *Attorney, Agent, or Firm* — Armstrong Teasdale LLP

(57) ABSTRACT

A chewing gum product containing a cross-linked gelatin matrix gum base and a bulking agent of erythritol, mannitol, or mixtures thereof. The cross-linked gelatin matrix can make up all or a portion of the gum base and still be comparable to that of a traditional elastomeric chewing gum product in its elasticity, cohesiveness, and feel in the mouth. The chewing gum of the present invention is also more environmentally friendly because it can be digestible and partially replace the need for petroleum-derived elastomers.

22 Claims, No Drawings

(56) References Cited

FOREIGN PATENT DOCUMENTS

| | | |
|---|---|---|
| JP | 2007089579 A | 4/2007 |
| WO | WO1992002149 A1 | 2/1992 |
| WO | WO1993006740 A1 | 4/1993 |
| WO | WO1993012665 A1 | 7/1993 |
| WO | 9508959 A1 | 4/1995 |
| WO | 2005048965 A2 | 6/2005 |
| WO | 2005092112 A1 | 10/2005 |
| WO | 2008057571 A1 | 5/2008 |
| WO | 20090123597 A1 | 5/2009 |
| WO | WO2009124067 A1 | 8/2009 |

OTHER PUBLICATIONS

Zumbe, et al., "Polyols in confectionery: the route to sugar-free, reduced sugar and reduced calorie confectionery", British Journal of Nutrition (2001), vol. 85, Suppl. 1, pp. S31-S45.

\* cited by examiner

CHEWING GUM CONTAINING A CROSS-LINKED GELATIN MATRIX GUM BASE

CROSS REFERENCE TO RELATED APPLICATIONS

This application is a 371 U.S. National Phase patent application of International Application Serial Number PCT/US2011/42642 filed on Jun. 30, 2011, which claims priority from U.S. Provisional Patent Application 61/362,473 filed on Jul. 8, 2010; the entire contents of each of these applications are incorporated herein by reference for all purposes.

BACKGROUND OF THE INVENTION

The present invention relates to chewing gum. More specifically, this invention relates to improved formulations for chewing gum containing a cross-linked gelatin matrix gum base and a bulking agent comprised of erythritol, mannitol, or mixtures thereof. The cross-linked gelatin matrix of the present invention can be used either alone or in combination with elastomers traditionally used in conventional chewing gum to form a cross-linked gelatin matrix gum base. This cross-linked gelatin matrix gum base is then combined with mannitol and/or erythritol, which serve as the bulking agent, to form the final chewing gum product. The chewing gum of the present invention is more easily digestible and disposed of, environmentally friendly, and potentially biodegradable.

The fundamental components of a traditional chewing gum typically are a water-insoluble gum base portion and a water-soluble portion. The primary component of traditional gum base is an elastomeric polymer which provides the characteristic chewy texture of the product. The gum base will typically include other ingredients which modify the chewing properties or aid in processing the product. These include plasticizers, softeners, fillers, emulsifiers, plastic resins, as well as colorants and antioxidants. The water soluble portion of the chewing gum typically includes a bulking agent together with minor amounts of secondary components such as flavors, high-intensity sweeteners, colorants, water-soluble softeners, gum emulsifiers, acidulants, and sensates. Typically, the water-soluble portion, sensates, and flavors dissipate during chewing and the gum base is retained in the mouth throughout the chew.

The elastomers found in traditional chewing gum base are normally derived from a petroleum feedstock and processed to food-grade standards. Recently, consumers have expressed preference for more natural foods and a desire to minimize use of products derived from petroleum. Additionally, due to fluctuations in the price and supply of petroleum, continued availability of these food-grade elastomers has become uncertain. While some non-petroleum derived elastomers have been proposed, problems with cost, supply, texture, flavor, or the use of potentially toxic solvents and reagents have precluded widespread implementation of these alternative elastomers. In this regard, it is desirable to find an inexpensive, readily available, consumer acceptable gum base which is derived from a natural food ingredient and processed without using potentially toxic solvents and reagents. A non-petroleum based gum base could be combined with conventional elastomeric petroleum based gum bases to help make chewing gum more natural and minimize the use of petroleum products in order to preserve the availability of petroleum products.

Another problem with traditional gum bases is the nuisance of gum litter when chewed gum cuds are improperly discarded. While consumers can easily dispose of chewed cuds in waste receptacles, some consumers intentionally or accidentally discard cuds onto sidewalks and other environmental surfaces. The nature of conventional gum bases can cause the improperly discarded cuds to adhere to the environmental surface and subsequently to be trampled by foot traffic into a flattened embedded mass which can be extremely difficult to remove.

The cross-linked gelatin matrix gum base of the present invention, either combined with traditional elastomeric gum base and gum base ingredients or used as the sole component of the gum base, addresses some of the problems associated with solely petroleum based chewing gum bases and also the environmental problems associated with disposing of traditional chewing gum. A commercially acceptable chewing gum containing a cross-linked gelatin matrix base as part of the insoluble portion of the chewing gum has not been previously made because many of the gum ingredients found in traditional chewing gum are not compatible with the cross-linked gelatin matrix. In fact many ingredients, including most polyols, cause the cross-linked gelatin matrix to become watery or to break apart into pieces or dissolve either in the mixer or in the mouth while chewing. Thus the main problem with creating a chewing gum having a cross-linked gelatin gum matrix as a base ingredient is creating a commercially acceptable chewing gum. A commercially acceptable chewing gum is one that has a cohesive character, forms an elastic and chewable cud during chew, and does not dissolve under mouth conditions. Mouth conditions represent a combination of temperature, moisture, and pH typically found in the mouth of a human as well as the shear, compression and other mechanical forces applied by the teeth during chewing. The majority of commonly used polyol bulking agents cause the cross-linked gelatin matrix to become extremely watery or crumbly in the mixer since the polyols will not combine with the cross-linked gelatin matrix to form a chewing gum. Even if a mixture is formed, the mixture falls apart or dissolves in the mouth when chewed and thus will not create a commercially acceptable chewing gum.

This invention is directed to a novel chewing gum containing a cross-linked gelatin matrix portion, which serves as part of if not the entire gum base, with an added bulking agent of erythritol, mannitol, or mixtures thereof. The combination of one or both of these two polyol bulking agents with the cross-linked gelatin matrix base provides a consumer acceptable commercial chewing gum because, unlike other commonly used polyol bulking agents, mannitol and erythritol are the only two that give the chewing gum a cohesive and chewable character with elasticity without having it dissolve or disintegrate under mouth conditions

SUMMARY OF THE INVENTION

A chewing gum comprising a water soluble portion and a water insoluble portion. The water insoluble portion contains a cross-linked gelatin matrix base and the water soluble portion contains a bulking agent made up of either mannitol or erythritol or combinations thereof. The cross-linked gelatin matrix can be used as the sole chewing gum base component or in combination with traditional elastomeric gum base ingredients. The cross-linked gelatin matrix based chewing gum of the present invention is cud-forming, elastic, chewable and does not disintegrate under mouth conditions. Additionally, other common chewing gum ingredients that are used in traditional chewing gum can be added to the cross-linked gelatin matrix based chewing gum as long as the mixture remains a cohesive mass that is capable of forming a cud and being chewable under mouth conditions without dissolving.

DESCRIPTION OF THE INVENTION

The present invention provides improved chewing gum formulations that are not completely petroleum based, are environmentally friendly, are potentially biodegradable, and potentially may be swallowed. Additionally the present invention allows for traditional chewing gum base to be partially replaced by a non-petroleum based component that has characteristics similar to traditional elastomers used in chewing gum bases. In accordance with the present invention, the novel chewing gum includes a cross-linked gelatin matrix, making up a portion of or the entire gum base, comprising gelatin, water, and a cross-linking agent wherein erythritol and/or mannitol are/is added to the base typically in an amount necessary to add texture and reduce water content, but still form a cohesive and elastic mass that can be sold as a commercially acceptable chewing gum. The cross-linking agent may be, but is not limited to, a polyphenol, a combination of polyphenols, cross-linking enzymes, gums, other cross-linkers, and combinations thereof.

Gelatin is a translucent, colorless, and nearly tasteless solid substance derived from the collagen inside animals' skin and bones. It has been commonly used for a variety of purposes in food and is classified as a foodstuff. Gelatin is a protein produced by partial hydrolysis of collagen extracted from the animal collagen. Gelatin melts to a liquid when heated and solidifies when cooled again. Together with water, it forms a semi-solid colloid gel. Gelatin forms a solution of high viscosity in water, which sets to a gel on cooling, and its chemical composition is, in many respects, closely similar to that of its parent collagen. Gelatin is 98-99% by dry weight protein and is unusually high in the non-essential amino acids glycine and proline (i.e., those produced by the human body), while lacking certain essential amino acids (i.e., those not produced by the human body). It contains no tryptophan and is deficient in isoleucine, threonine, and methionine. A typical amino acid composition of gelatin is: 21% glycine, 12% proline, 12% hydroxyproline, 10% glutamic acid, 9% alanine, 8% arginine, 6% aspartic acid, 4% lysine, 4% serine, 3% leucine, 2% valine, 2% phenylalanine, 2% threonine, 1% isoleucine, 1% hydroxylysine, less than 1% methionine and histidine, and less than 0.5% tyrosine. These values vary, especially the minor constituents, depending on the source of the raw material and processing technique. Gelatin is tested and graded according to its strength. The grade is based on the "Bloom" test and the higher the Bloom number the higher the grade. Bloom can range from 30 to 350.

Polyphenols are a group of chemical substances found in fruit and plants, characterized by the presence of more than one phenol unit or building block per molecule. Polyphenols are generally divided into hydrolysable tannins (gallic acid esters of glucose and other sugars) and phenylpropanoids, such as lignins, flavonoids, and condensed tannins. Examples of such polyphenols include, but are not limited to, coumaric acid derived lignins, kaempferols, catechins, quercetins, caffeic and ferulic acids, derived lignins, hydroxytyrosol esters, gallocatechins (EGCG, eGC, EC), tannins, myricetin, sinapyl alcohol derived lignins, resveratrol, flavonoids, and arbutin. An example of a plant extract containing polyphenols is green tea extract. Green tea extract contains large amounts of polyphenols, particularly catechins, the most abundant of which is EGCG.

Cross-linking agents, other than polyphenols, that can be used to form the cross-linked gelatin matrix are cross-linking enzymes, such as transglutaminase, gums, such as pectin, agar, locust bean gum, carrageenan, konjac, and gum arabic, or a natural cross-linker, such as genepin. The preferred embodiment is for the cross-linking agent to be a polyphenol or a combination of polyphenols.

A variety of chewing gum formulations can be created which include the cross-linked gelatin matrix and erythritol and/or mannitol combination of the present invention. All these chewing gum formulations involve the gelatin and cross-linking agent being mixed together, in the presence of water, to form a matrix which serves as a portion of or the entire chewing gum base. As previously mentioned the preferred embodiment is for the cross-linking agent to be a polyphenol or a polyphenol containing plant or fruit extract with a high polyphenol concentration. In some embodiments, the resulting cross-linked gelatin matrix has a polyphenol to gelatin ratio as low as 0.3:1 or as high as 1:1. However, it is preferred that the resulting cross-linked gelatin matrix of the present invention contain a polyphenol to gelatin ratio between 0.7:1 and 1:1. It is most preferable that the resulting polyphenol to gelatin ratio be between 0.75:1 and 0.85:1.

In some embodiments the cross-linked gelatin matrix gum can be made using a precipitate method. The precipitate method involves creating two solutions wherein one solution is a combination of gelatin with a large amount of water and the second solution is a combination of polyphenol with a large amount of water. The gelatin solution is heated to dissolve the gelatin. The polyphenol solution is then added to the gelatin solution to form precipitates of cross-linked gelatin matrix. Precipitate, the cross-linked gelatin matrix, is then removed from the mixture and is used as all or part of the gum base. The processing temperature must be low enough to prevent degradation of the gelatin, but high enough to allow the gelatin to melt and form a homogeneous matrix product. Additionally, the processing temperature must be sufficient enough for the reaction to occur, such as above 25° C. or above 28° C. In other embodiments of the precipitate method, the processing temperature may be at least 30° C. The temperature should also not be so high as to affect the structure, such as up to 90° C. In other embodiments, the temperature may be up to 55° C. In some embodiments of the precipitate method, the processing temperature ranges from 28 to 90° C. However, it is preferred that the processing temperature of the precipitate method be 30 to 55° C. In some embodiments of the precipitate method the ratio of dry polyphenol to gelatin starting material is as low 0.1:1 and as high as 1:1. However, it is preferred that the ratio of dry polyphenol to gelatin starting material ratio be 0.7:1 to 1:1. It is most preferable that the dry polyphenol to gelatin starting material ratio be 0.75:1 to 0.85:1.

In some embodiments the cross-linked gelatin matrix can be made using a solution setting method. The solution setting method involves creating a solution of polyphenol with water wherein there is just a bit more water than polyphenol. The solution is then added to dry gelatin in a mixer to create a homogeneous viscoelastic material that is used as the gum base. Similarly to the precipitate method, the processing temperature must be low enough to prevent degradation of the gelatin, but high enough to allow the gelatin to melt and form a homogeneous matrix product. The processing temperature also needs to be sufficient enough to allow the reaction to occur, such as at least 25° C. or at least 28° C. In other embodiments of the solution setting method, the processing temperature may be at least 30° C. The temperature should not be so high as to affect the structure of the matrix, such as up to 90° C. In other embodiments, the temperature may be up to 55° C. In some embodiments the processing temperature for the solution setting method is 28 to 90° C. However, it is preferred that the processing temperature of the solution setting method be about 30 to 55° C. In some embodiments of the solution setting method the ratio of dry polyphenol to gelatin starting material is as low as 0.3:1 and as high as 1:1. However, it is preferred that the ratio of dry polyphenol to gelatin starting material be as low as 0.7:1 to 1:1. It is most preferable that the ratio of dry polyphenol to gelatin starting material be 0.75:1 to 0.85:1.

In some embodiments the cross-linked gelatin matrix can be made using alternate methods that are not described herein. In the preferred embodiments of a cross-linked gelatin matrix made by alternate methods, the resulting cross-linked gelatin matrix has a polyphenol to gelatin ratio as low as 0.3:1 and as high as 1:1. However, it is preferred that the resulting cross-linked gelatin matrix has a polyphenol to gelatin ratio between 0.70:1 and 1:1. More preferably, the resulting cross-linked gelatin matrix has a polyphenol to gelatin ratio between 0.75:1 and 0.85:1. Cross-linked gelatin matrix based chewing gum with these ratios have a dissolution time exceeding 60 minutes regardless of the method used to form the cross-linked gelatin matrix gum base.

As previously mentioned, in some embodiments, the cross-linked gelatin matrix can be made using cross-linking agents other than polyphenols. In some embodiments the cross-linking may occur through covalent bonding. In some embodiments, the cross-linking may be achieved through hydrogen bonding and/or hydrophobic interaction. Any method or chemical reagent may be used to make the cross-linked gelatin matrix as long as the resulting matrix is safe for human consumption and is capable of forming a cud which is elastic, chewable, and which does not disintegrate under mouth conditions.

In some embodiments the cross-linked gelatin matrix, made using any method, can be freeze dried, or dried in any other manner that removes water. Drying the matrix to remove the water is ideal for storage purposes. The cross-linked gelatin matrix can then be rehydrated with water to the desired moisture content necessary for its use as gum base.

In some embodiments the cross-linked gelatin matrix has a water content as low as 15% and in other embodiments it has a higher water content, as high as 60%. However, more preferably the water content of the cross-linked gelatin matrix is between 15 and 30%. Typically, water content may be kept at a level below which mold would grow, but high enough so that the gum retains its elasticity. This improves the shelf-life thus making a more commercially acceptable chewing gum.

Traditionally, bulking agents have been used to add volume and texture to commercial chewing gum products. Bulking agents can also be used to help reduce water content of the chewing gum. The most common bulking agent used in chewing gum formulations is sucrose. With current needs and markets shifting towards more sugar-free products, polyols have become increasingly popular bulking agents due to their lower caloric content. Polyols are alcohols containing multiple hydroxyl groups. Science would lead us to believe that all bulking agents, commonly used in traditional chewing gum, could also be used as a bulking agent with a cross-linked gelatin matrix gum base. Typical bulking agents include mannitol, isomalt, erythritol, maltitol, xylitol, sorbitol, and maltodextrin. The most common bulking agent for sugar-free chewing gum is sorbitol. In fact, sucrose, sorbitol, and the majority of other polyols and other commonly used bulking agents do not create a commercially acceptable chewing gum when combined with the cross-linked gelatin matrix in the gum base. Many of these ingredients actually cause the cross-linked gelatin matrix comprising all or part of the gum base to get watery, fall apart, or dissolve either in the mixer or upon chewing in the mouth. We have surprisingly discovered that the only two commonly used bulking agents that combine with the cross-linked gelatin matrix gum base successfully are mannitol and erythritol. Both mannitol and erythritol are compatible with the cross-linked gelatin matrix gum base both in the mixer and when chewed.

By compatible, it is meant that there is no phase separation and the matrix remains intact in the mixer and has an elastic and chewy quality similar to that of traditional chewing gum when chewed. Additionally, the matrix does not break down when the chewing gum, containing the cross-linked gelatin matrix as all or part of the gum base, is chewed in excess of 60 minutes. The chewing gum also retains a uniform, single phase, and homogeneous appearance. Testing was conducted using common bulking agents and described in detail in the comparative runs. Testing revealed that there was phase separation and/or breaking of the cross-linked gelatin matrix at the addition of small amounts of bulking agents other than erythritol and mannitol. Among the other common bulking agents tested were isomalt, maltitol, sucrose, xylitol, and sorbitol. All of these commonly used ingredients showed phase separation at ratios as small as 0.08:1 or less of polyol to cross-linked gelatin matrix. The addition of more of these incompatible ingredients eventually caused the cross-linked gelatin matrix to break in the mixer.

Mannitol and erythritol thus gave surprising results compared to other bulking agents. Both mannitol and erythritol could be added to the cross-linked gelatin matrix up to a ratio of 9:1 mannitol or erythritol to cross-linked gelatin matrix or a total of up to 9:1 of mannitol and erythritol combined to cross-linked gelatin matrix. This provides for up to 90% of the chewing gum to consist of bulking agent. In some embodiments, for example when the polyphenol to gelatin ratio is in the lower ranges, it is preferable to add less mannitol and/or erythritol, as low as 5% of the chewing gum (or 0.05:1 mannitol and/or erythritol to cross-linked gelatin matrix). The lesser amounts of mannitol and/or erythritol may be used in the lower ranges of polyphenol to gelatin ratios to produce a commercially acceptable chew without breaking the cross-linked gelatin matrix.

In some embodiments, erythritol or mannitol may be used as the sole bulking agent. In other embodiments the bulking agent is a combination of erythritol and mannitol wherein the percentage of erythritol ranges from 1 to 99% and the percentage mannitol ranges from 1 to 99%. In another embodiment erythritol and/or mannitol may be combined with small amounts of other polyols and other bulking agents such as sugar, polydextrose, and water soluble fibers up to a level that does not affect the cohesiveness of the cross-linked gelatin matrix used in the gum base. In other embodiments other polyols may be included up to a ratio of 0.15:1 polyol to gelatin as long as cohesiveness of the cross-linked gelatin matrix is not affected. Such other polyols include isomalt, maltitol, xylitol, lactitol, and sorbitol. However, it is preferred that the chewing gum formulation of the present invention be a combination of the cross-linked gelatin matrix, used in a portion of or as all of the gum base, with a bulking agent comprised of a combination of mannitol and erythritol.

In some embodiments of the present invention, the cross-linked gelatin matrix will be the sole component of the insoluble portion of the chewing gum. In other embodiments the insoluble portion may be comprised of cross-linked gelatin matrix combined with fillers, softeners, emulsifiers, elastomers, elastomer solvents, plastic resins, antioxidants, colors, flavors, and/or other petroleum-based materials approved for use in food. Although these ingredients are typically found in the insoluble portion of a chewing gum, they can also be added to the soluble portion of the chewing gum. In some preferred embodiments of the present invention, the insoluble portion of the chewing gum is comprised of only materials and food ingredients that are digestible, not petroleum based, and potentially biodegradable. The more preferable embodiment of the present invention is for the insoluble portion of the chewing gum to be solely comprised of cross-linked gelatin matrix. By biodegradable it is meant that the chewing gum is capable of being decomposed by biological agents or naturally degrades as time goes by.

Having the insoluble portion of the chewing gum base comprised solely of cross-linked gelatin matrix, when chewed, creates a cud that can be fully digested, is not petroleum based, and is potentially biodegradable. In addition to reducing disposal issues by being easily digestible, the cud formed by the cross-linked gelatin matrix based chewing gum, whether the base is partially or fully comprised of the cross-linked gelatin matrix, is also more easily removed from surfaces than traditional petroleum based chewing gum products. In cases where the chewed cuds are disposed of improperly and wind up on sidewalks and other environmental surfaces, the cross-linked gelatin matrix portion of the chewing gum base becomes more and more brittle with time, rather than sticky like traditional chewing gum products, due to water evaporating from the cross-linked gelatin matrix portion of the chewing gum. The more brittle character of the chewing gum thus makes it more easily removable than sticky chewing gum.

In order to further enhance the removability of cuds formed from chewing gums containing the gum bases described herein, it may be desirable to incorporate other known removability-enhancing features into the gum base and/or chewing gum.

For example, certain additives such as emulsifiers and amphiphilic polymers may be added. Another additive which may prove useful is a polymer having a straight or branched chain carbon-carbon polymer backbone and a multiplicity of side chains attached to the backbone as disclosed in WO 06-016179 hereby incorporated by reference herein in its entirety for any and all purposes, to the extent that it is not contradictory to the teachings provided herein. Still another additive which may enhance removability is a polymer containing hydrolyzable units or an ester and/or ether of such a polymer. One such polymer containing hydrolyzable units is a copolymer sold under the trade name Gantrez®. Addition of one or more such polymers at levels of from about 1 wt % to about 20 wt % based upon the total weight of the chewing gum base may reduce adhesion of discarded gum cuds.

By substituting the cross-linked gelatin matrix of the present invention for all or part of the conventional elastomeric gum base or by incorporating other known removability-enhancing features into the chewing gum base and/or chewing gum a more safe, economical, environmentally friendly, and also consumer acceptable chewing gum product can be manufactured. Additionally, by substituting all or part of the conventional elastomeric gum base with the cross-linked gelatin matrix the manufacturers of chewing gum use less petroleum-derived ingredients of potentially uncertain availability.

In other embodiments, the soluble portion of the cross-linked gelatin matrix based chewing gum, containing erythritol and/or mannitol, can be combined with plasticizing agents, fillers, colors, flavors, antioxidants, emulsifiers, sweeteners (including high-intensity sweeteners), acidulants, sensates, other conventional non-elastomeric gum base components, pharmaceuticals or nutraceutical agents, and combinations thereof. Although these ingredients are typically found in the soluble portion of a chewing gum, they can also be added to the insoluble portion of the chewing gum. Other optional ingredients, not mentioned herein, can also be added to either the soluble or insoluble portions of the chewing gum. The cross-linked gelatin matrix based chewing gums may be formed into sticks, tabs, tapes, coated or uncoated pellets or balls, or any other desired form. By substituting the cross-linked gelatin matrix for all or part of conventional gum base elastomers and combining the cross-linked gelatin matrix gum base with either erythritol and/or mannitol as described in the present invention, consumer acceptable chewing gum products may be manufactured which exhibit partially or entirely digestible, more environmentally friendly, and potentially biodegradable properties.

Some problems encountered with creating a gelatin based gum base, like the cross-linked gelatin matrix used in the gum base of the present invention, include the high water content of a typical gelatin matrix. To solve this problem a bulking agent must be used; however, as previously mentioned most bulking agents commonly used in the chewing gum industry actually cause the cross-linked gelatin matrix to break apart when added in a ratio high enough to reduce the water content appropriately. The resultant chewing gum falls apart either in the mixer or upon chewing in the mouth. Erythritol and mannitol show good compatibility with the cross-linked gelatin matrix base at ratios high enough to reduce the water content to a commercially acceptable level, but still cause the chewing gum to retain elasticity. However, another challenge is that as water content of the gelatin is reduced, the lower moisture causes higher processing temperatures which then cause the gelatin to degrade and have processing issues. For instance, as the water content of the cross-linked gelatin matrix decreases below 15%, higher processing temperatures are necessary which could degrade the gelatin. A commercially acceptable level is one that creates a water content low enough so that mold does not grow and shelf-life is increased, but high enough that degradation of the gelatin does not occur, the chewing gum retains elasticity, and processing issues are at a minimum, thus producing a final product with good elasticity and chew comparable to traditional petroleum-based gum bases.

Another approach to balancing the water content and shelf-life of a gelatin-based chewing gum, such as that of the present invention, to make a commercially acceptable chewing gum is through the addition of an antimicrobial product to retard mold. The antimicrobial product can be incorporated into the insoluble or soluble portion of the gum product. In one embodiment, an antimicrobial polyphenol, such as green tea extract, can be used as the cross-linking agent in forming the cross-linked gelatin matrix. Green tea extract exhibits antimicrobial properties that can retard mold. This allows for the use of a higher water content that is balanced by the addition of erythritol or mannitol and the ratio of polyphenol to gelatin in the matrix.

A gelatin gum base with a 30 to 50% moisture content is ideal for proper processing; however, this can be a bit high for preventing mold. The erythritol and mannitol would thus be used to lower the moisture content to an acceptable level after formation of the cross-linked gelatin matrix. In the finished cross-linked gelatin matrix based chewing gum product a range of less than 15% moisture is effective in balancing the water content for proper mixing and deterring the growth of bacteria and mold. Additionally, as mentioned previously antimicrobial agents can be incorporated into either the soluble or insoluble portions of the chewing gum. Any combination of the above approaches may be employed simultaneously to achieve improved texture, elasticity, and longevity.

The cross-linked gelatin matrix gum base and erythritol and/or mannitol combination, when used according to the present invention, affords the chewing gum consumer acceptable texture, shelf life, and flavor quality while being disposed of easily. Additionally, because the cross-linked gelatin matrix, used as all or part of the gum base, and erythritol and/or mannitol combination has chewing properties similar to those of chewing gums with traditional elastomeric gum bases, chewing gums containing this combination create resultant chewing gum products that have high consumer acceptability with less of a need for petroleum products.

COMPARATIVE RUNS AND EXAMPLES

The following comparative runs and examples of the invention are provided to illustrate, but not to limit, the invention which is defined by the attached claims.

Comparative Runs 1 through 8 demonstrate what happens when different polyol bulking agents are combined with the cross-linked gelatin matrix gum base prepared by both precipitate and solution setting methods. The cross-linked gelatin matrix gum bases were prepared in one of two methods, either precipitate or solution setting, in order to achieve a polyphenol to gelatin ratio between 0.7 and 0.9. In both methods water, gelatin, and a polyphenol-containing extract, green tea extract containing greater than 90% polyphenol specifically, were mixed together. A 275 Bloom gelatin was chosen for all the runs. As previously mentioned, the major difference between the two methods is the amount of water used and how the cross-linked gelatin matrix is recovered.

In the precipitate method 100 grams of gelatin were combined with about 1000 grams of water (about 10:1 ratio of water to gelatin) to form a solution. About 85 grams of green tea extract (greater than 90% polyphenol) were also combined with about 850 grams of water (about a 10:1 ratio of water to green tea extract). The gelatin solution was heated up to 45° C. so that the gelatin dissolved. The green tea extract solution was then added to the gelatin while the solution was being mixed. In this particular instance 9 parts of green tea extract solution were added to 11 parts gelatin solution to form a finished cross-linked gelatin matrix gum base with a ratio of approximately 0.8:1 green tea extract to gelatin. The starting ratio of gelatin solution to green tea extract solution can be varied to achieve the desired yield of cross-linked gelatin matrix gum base. Precipitate formed as the solution was being mixed. The precipitate that had formed was then removed to be used as gum base. In using the precipitate method no matter what the ratio of the starting material was, whether 0.1:1 green tea extract to gelatin or 0.8:1 green tea extract to gelatin, the final cross-linked gelatin matrix gum base product that precipitated out of the water had a ratio of approximately 0.8:1 green tea extract to gelatin with a moisture content ranging from about 45 to 48%. The starting ratio of polyphenol to gelatin had no affect on the composition of the final cross-linked gelatin gum base, it only affected the yield.

In the solution setting method the cross-linked gelatin gum base was prepared by first mixing the green tea extract with water (approximately 23 grams of green tea extract containing greater than 90% polyphenol in 30 grams water) to form a solution. The green tea extract solution was then added to 47 grams of dry gelatin and mixed at 35° C. until a homogeneous solution was formed. This particular combination formed a cross-linked gelatin matrix gum base having about a 0.8:1 ratio of green tea extract to gelatin and a moisture content of about 25-35%. To achieve different ratios, the amount of green tea extract in the water solution can be adjusted. In this case (the solution setting method), different starting ratios of polyphenol and gelatin resulted in different ending ratios of polyphenol to gelatin in the final cross-linked gelatin gum base product.

The final cross-linked gelatin matrix gum base, using both the precipitate and solution setting methods, had a ratio ranging from 0.75:1 to 0.85:1 polyphenol to gelatin with a pH between 4.5 and 6.0. As previously mentioned, the cross-linked gelatin gum matrix can be made using the two methods described or any other method not mentioned herein as long as the ratio of polyphenol to gelatin remains in the appropriate range so that the chewing gum stays cohesive and intact in the mixer and chewable and elastic, without dissolving, under mouth conditions.

Due to the higher moisture content of the cross-linked gelatin matrix gum base, it is preferred that a bulking agent is added to bring the moisture down to a level that will increase the final chewing gum product's shelf-life and texture. Thus, different polyols often used in commercial chewing gum as bulking agents were tested for compatibility with the cross-linked gelatin matrix gum base in the following comparative runs. Specifically, mannitol, isomalt, erythritol, maltitol, sucrose, xylitol, and sorbitol were all tested using both the precipitate and the solution setting formed cross-linked gelatin matrix gum bases.

Comparative Run 1

Using the precipitate method prepared gum base 30 grams of the cross-linked gelatin matrix gum base were put in a mixer and mannitol was slowly added in small increments at a temperature of 40° C. With every increment the gum base mixture remained intact and the mannitol mixed in homogeneously. The maximum amount of mannitol that was added to the gum base was 92 grams to form approximately a 3:1 ratio of mannitol to gum base. At the 3:1 ratio the matrix of the cross-linked gelatin remained intact, had a cohesive and homogeneous appearance, and was very elastic. The same method was followed for the addition of mannitol to the solution setting method prepared gum base. The maximum amount of mannitol added was 66 grams giving a 2.2:1 ratio of mannitol to gum base. This ratio showed good compatibility and an intact matrix. The amount of mannitol added to the solution setting method prepared base could have been greater, but was stopped at a ratio of 2.2:1 arbitrarily. The finished products were also chewed. Neither product broke down during chew. Both products formed a cud similar to that formed when chewing traditional chewing gum with an elastomeric base. The product was chewed in excess of 60 minutes.

Comparative Run 2

Using the precipitated gum base, sucrose was added incrementally to 40 grams of the cross-linked gelatin matrix gum base in the same manner as the mannitol. Unlike the mannitol, the sucrose did not incorporate into the gum base and caused water to come out of the gum base at an amount as small as 7-8 grams of sucrose. As more sucrose was added, more water came out of the gum base and the water dissolved the sucrose creating a two-phase mixture. The addition of sucrose was stopped at 53 grams. The final mixture of sucrose and gum base resulted in a non-homogeneous, granular product that was hard, sticky and had limited elasticity. Similar results were achieved with the solution setting method gum base. The finished product was lumped together and chewed. The separate phases of the finished product did not combine in the mouth and formed a product that was malleable, but with little if any elasticity as it could not be stretched after chew.

Comparative Run 3

Using the precipitated gum base, sorbitol was added to 30 grams of the cross-linked gelatin matrix gum base incrementally in the same manner as the mannitol. Similar to sucrose, the sorbitol began pulling water out of the gelatin gum base and dissolving in the water after an addition of 8 grams. As more sorbitol was added, the mixture remained in two phases and the sorbitol began clumping and not mixing in with the base at all. The addition of sorbitol was stopped at 43 grams. The finished product was in two phases (solid base and liquid), granular, had white clumps of sorbitol (never mixed in), and was not homogeneous or cohesive at all; however, it was a bit more elastic than the sucrose. Like sucrose, the sorbitol pulled water out of the base; however, unlike sucrose the sorbitol did not dissolve as well in the water, instead the sorbitol formed white clumps. Similar results were achieved with the solution setting method gum base. The finished product was lumped together and chewed. The product reacted similarly to sucrose in the mouth—it never came together as one mass and was not very elastic.

Comparative Run 4

Using the precipitated gum base, isomalt was incrementally added to 40 grams of cross-linked gelatin matrix gum base in the same manner as the mannitol. After addition of 4 grams of isomalt, the mixture began separating into separate phases just like the sucrose and sorbitol. As more isomalt was added, the isomalt began to mix into the gum base more to create a more cohesive mass; however, there was phase separation as more and more water was pulled out of the gum base and the mixture was non-homogeneous. The addition of isomalt was stopped at 53 grams. At this point the mixture had crumbled into small pieces, there were two different phases, where one phase appeared white in color, and there was no cohesiveness or elasticity whatsoever. The solution setting method prepared gum base reacted similarly. The resultant isomalt and base mixture was chewed by lumping some of the mixture together. In the mouth, the isomalt mixture remained in a number of small pieces and the white portion of isomalt dissolved right away. After chewing for a while, the mixture did form a cud that was bouncy and sticky in the mouth; however, it was gritty and non-elastic.

Comparative Run 5

Using the precipitated gum base, xylitol was added incrementally to 40 grams of cross-linked gelatin matrix gum base in the same manner as the mannitol. After addition of only 5.5 grams of xylitol a large amount of water began to come out of the base, much larger than the sucrose and sorbitol. As more xylitol was added, the xylitol did not combine with the gum base to form a homogeneous mixture and more and more water came out, more than any other polyol tested. The addition of xylitol was stopped at 55 grams and there was a large white mass separate from the gum base. The mixture was not elastic, cohesive, or homogeneous and became hard. The solution setting method prepared gum base reacted similarly. The gum base/xylitol mixture was chewed. In the mouth, it was in several small pieces and was hard, brittle, and had no elasticity.

Comparative Run 6

Using the precipitated gum base, maltitol was added to 40 grams of gum base incrementally in the same manner as the mannitol. At the addition of about 5 grams of maltitol the mixture began to release water. As more maltitol was added, the maltitol seemed to pull more water out of the gum base and dissolve in the water similarly to sucrose. The addition of maltitol was stopped at 53 grams. The final mixture was more homogeneous than many of the polyols due to the maltitol dissolving; however, the mixture was very crumbly and in small, hard pieces with no elasticity. The solution setting method prepared gum base reacted similarly. The maltitol/gelatin mixture was chewed. In the mouth, the mixture softened a bit and became malleable after a while, but was not very elastic.

Comparative Run 7

Using the precipitated gum base, erythritol was added to 30 grams of gum base incrementally in the same manner as the mannitol. After the addition of 4-5 grams some water came out of the gum base; however, as it mixed more the water was incorporated back into the base. As more erythritol was added, the erythritol began to blend with the gum base more and more. The addition of erythritol was stopped at 42 grams. At this point, the erythritol was mixed in with the gum base. The mixture was cohesive and elastic and resembled that of mannitol. Similar results were seen with the solution setting method prepared mixture. The erythritol/gelatin mixture was chewed. The mixture was elastic, more cohesive, and similar to mannitol in the mouth as well.

These results demonstrate that a commercially acceptable chewing gum cannot be made using sucrose, sorbitol, isomalt, xylitol, or maltitol. Sucrose, maltitol, sorbitol, and xylitol all have a hygroscopicity greater than that of erythritol and mannitol which explains the release of water from the gum base. These four polyols, and isomalt as well, also have a greater solubility than either mannitol or erythritol which explains their combination with water, whether dissolved in the water or forming a white fluid layer or clump. Isomalt, however, has a very low hygroscopicity, just like erythritol and mannitol, but also has a solubility comparable to, but still greater than that of erythritol and mannitol. Additionally, isomalt may act differently than erythritol and mannitol because it is a mixture of two disaccharides and the properties of one disaccharide may be causing the isomalt to react differently than the other.

Comparative Run 8

The resultant erythritol/gelatin chewing gum mixture described above in Comparative Run 7 was also mixed with sorbitol to see the effects of the combination of a polyol that successfully mixed with the gum base with one that did not. After the addition of 8 grams of sorbitol to the erythritol/gelatin chewing gum mixture, water began coming out of the mixture as it did in the sorbitol/gelatin chewing gum mixture of Comparative Run 3. As the sorbitol/erythritol/gelatin mixture continued to be mixed the water began to absorb back into the mixture. The addition of even more sorbitol, however, caused even more water to come out that could not be mixed back in. This shows the limitation on the amount of other polyols, other than erythritol and mannitol, that can be additionally combined to form a commercial chewing gum comprised of a cross-linked gelatin matrix gum base.

Examples 1 through 6 are examples of chewing gum formulations that were made into chewing gum pellets and chewed for greater than 60 minutes. A 275 Bloom gelatin was used in all the examples.

Example 1 and 2

Cross-linked gelatin matrix gum bases were formed using the precipitate and solution setting methods described above in approximately a 0.8:1 ratio of green tea extract (greater than 90% polyphenol) to gelatin. The cross-linked gelatin matrix gum bases were then combined with erythritol, mannitol, and other ingredients as specified in the chart. The amount of cross-linked gelatin matrix gum base used in each example differs in order to keep the moisture content and mass the same for both methods. The ingredients were mixed at 45° C.

| Ingrdient | Example 1 (wt. %) | Example 2 (wt. %) |
|---|---|---|
| Solution Setting Matrix | 28 | |
| Precipitate Matrix | | 32.66 |
| Mannitol | 37.7 | 37.7 |
| Erythritol | 33 | 28.34 |
| Sucralose | 0.3 | 0.3 |
| Flavor | 1 | 1 |
| Total | 100 | 100 |

Both of these chewing gum formulations were chewed for 65 minutes. At 65 minutes the chewing gum was still cohesive and elastic and the gum cud was a homogeneous mass comparable to an elastomeric based chewing gum.

Example 3 and 4

In two other examples, a greater number of chewing gum ingredients were added to the cross-linked gelatin matrix gum bases to form a commercially acceptable chewing gum that has chew, elasticity, and texture comparable to that of elastomeric chewing gum. These formulas were prepared using both the solution setting and precipitate methods at different ratios of starting material (polyphenol and gelatin). The starting ratios for the precipitated cross-linked gelatin matrix base ranged from 0.1:1 to 0.76:1 polyphenol to gelatin and the ratio the solution setting method prepared cross-linked gelatin matrix base was 0.76:1. These cross-linked gelatin matrix gum bases were then mixed with other ingredients at 45° C. as shown in the chart below:

| Ingredient | Example 3 (wt. %) | Example 4 (wt. %) |
|---|---|---|
| Solution Setting Matrix | 28 | |
| Precipitate Matrix | | 32.66 |
| Mannitol | 32.7 | 32.7 |
| Erythritol | 28 | 28 |
| Glycerin | 7 | 2.34 |
| Lecithin | 1 | 1 |
| Oil | 2 | 2 |
| Sucralose | 0.3 | 0.3 |
| Flavor | 1 | 1 |
| Total | 100 | 100 |

All formulations formed commercially acceptable chewing gum wherein the ratio of polyphenol to gelatin in the finished cross-linked gelatin matrix based chewing gum ranged from 0.75 to 0.84. One of the precipitate method chewing gums was chewed and resulted in a chew time in excess of 64 minutes. After that point the chewing gum cud was discarded, but was comparable to that of an elastomeric based chewing gum.

Examples 5 Through 7

In another three examples, many traditional chewing gum ingredients were added to the cross-linked gelatin matrix gum bases (prepared using the solution setting method) to form commercially acceptable chewing gum that has elasticity, texture, and chew comparable to that of typical elastomeric chewing gum. These formulas were prepared using a combination of erythritol and mannitol and also either erythritol or mannitol as the sole bulking agent. All other ingredients remained the same in all three examples.

| Ingredient | Example 5 (wt. %) | Example 6 (wt. %) | Example 7 (wt. %) |
|---|---|---|---|
| Solution Setting Matrix | 28 | 28 | 28 |
| Mannitol | 32.7 | 60.70 | |
| Erythritol | 28 | | 60.70 |
| Glycerin | 7 | 7 | 7 |
| Lecithin | 1 | 1 | 1 |
| Oil | 2 | 2 | 2 |
| Sucralose | 0.3 | 0.3 | 0.3 |
| Flavor | 1 | 1 | 1 |
| Total | 100 | 100 | 100 |

The chewing gum products made in examples 5 through 7 had a homogeneous composition that remained intact comparable to commercial elastomeric chewing gum.

Examples 8 through 10 show chewing gum formulations that were evaluated for toughness, bounciness, and stickiness against commercial chewing gum by a sensory panel. The formulations were first made by creating cross-linked gelatin matrix gum bases, having polyphenol to gelatin ratios of 0.5:1 and 0.6:1, using the solution setting method. The gum bases were mixed with mannitol and erythritol and then with the other formula ingredients to form chewing gum masses. Each chewing gum mass was sheeted and evaluated blind and in random order by 7 participants. Commercial gum was also rotated into the example order. The examples were chewed for 6 minutes.

| Ingredient (wt. %) | Example 8 | Example 9 | Example 10 |
|---|---|---|---|
| Polyphenol:Gelatin Ratio | 0.5:1 | 0.5:1 | 0.6:1 |
| Percentage of Cross-Linked Gelatin Matrix Gum Base | 28 | 35 | 35 |
| Mannitol | 32.7 | 28.7 | 28.7 |

-continued

| Ingredient (wt. %) | Example 8 | Example 9 | Example 10 |
|---|---|---|---|
| Erythritol | 28 | 25 | 25 |
| Glycerol | 7 | 7 | 7 |
| Lecithin | 1 | 1 | 1 |
| Oil | 2 | 2 | 2 |
| Sucralose | 0.3 | 0.3 | 0.3 |
| Flavor | 1 | 1 | 1 |
| Total | 100 | 100 | 100 |

Sensory data for the varying amounts of the cross-linked gelatin matrix gum base and varying ratios of polyphenol to gelatin ratios contained in Examples 8 through 10 can be found in the table below. The results showed that the three cross-linked gelatin matrix based chewing gums had toughness and bounciness scores similar to the commercial chewing gum example. Example 9, with a greater percentage of the cross-linked gelatin matrix gum base was closer to the commercial chewing gum example in toughness and bounciness relative to the other examples. Example 10, with the higher polyphenol to gelatin ratio and greater percentage amount had higher toughness and bounciness scores than the other examples, including the commercial chewing gum examples.

| 6 minute chew with a scale up to n = 7 | | | |
|---|---|---|---|
| | Toughness | Bounciness | Stickiness |
| Example 8 | 3.4 | 4.3 | 3.4 |
| Example 9 | 3.6 | 4 | 4.4 |
| Example 10 | 5.1 | 5.9 | 3.7 |
| Commercial Chewing Gum | 3.6 | 3.6 | 1.9 |

Example 8 was also chewed over a period of 30 minutes before it was discarded to evaluate for toughness, bounciness, and stickiness over the time period. The results showed that the product became more sticky and less bouncy as the cross-linked gelatin matrix based chewing gum was chewed.

The results demonstrate that in order to make a commercially acceptable chewing gum comprised of a cross-linked gelatin matrix base that does not break apart in the mixer or dissolve in the mouth during chew under mouth conditions, only erythritol and mannitol can be used as bulking agents to reduce water content and provide texture. The finished chewing gum product can be made up of the cross-linked gelatin matrix gum base and erythritol and/or mannitol. Additional ingredients can also be added to the chewing gum product in an amount that does not cause the cross-linked gelatin matrix to fall apart or release water in the mixer or dissolve in the mouth under mouth conditions.

The compositions and methods of the present invention are capable of being incorporated in the form of a variety of embodiments, only a few of which have been illustrated and described above. The invention may be embodied in other forms without departing from its spirit or essential characteristics. The described embodiments are to be considered in all aspects only as illustrative and not restrictive, and the scope of the invention; therefore, is indicated by the amended claims rather than the foregoing description. All changes which come within the meaning and range of equivalency of the claims are to be embraced within their scope.

What is claimed is:

1. A chewing gum comprising 20 to 35% by weight cross-linked gelatin matrix gum base, and a bulking agent comprising mannitol and erythritol, wherein the chewing gum comprises 20 to 35% by weight erythritol and 25 to 40% by weight mannitol with all weights based on the weight of the chewing gum, wherein said chewing gum is cud-forming, elastic, chewable and does not disintegrate under mouth conditions, and wherein said chewing gum comprises polyols other than mannitol and erythritol in a weight ratio of the other polyols to cross-linked gelatin matrix gum base of 0.15:1 or less.

2. The chewing gum of claim 1 wherein the cross-linked gelatin matrix gum base comprises a gelatin wherein the gelatin is selected from the group consisting of different blooms, different sources, and combinations thereof.

3. The chewing gum of claim 1 wherein the cross-linked gelatin matrix gum base comprises a cross-linking agent which is a polyphenol or combination of polyphenols.

4. The chewing gum of claim 3 wherein the polyphenol is selected from the group consisting of hydrolyzable tannins, phenylpropanoids, and combinations thereof.

5. The chewing gum of claim 3 wherein the polyphenol is selected from the group consisting of coumaric acid derived lignins, kaempferols, catechins, quercetins, caffeic and ferulic acids, derived lignins, hydroxytyrosol esters, gallocatechins (EGCG), tannins, myricetin, sinapyl alcohol derived lignins, resveratrol, flavonoids, arbutin, and combinations thereof.

6. The chewing gum of claim 3 wherein the polyphenol is obtained from a plant or fruit extract.

7. The chewing gum of claim 6 wherein the plant extract is green tea extract.

8. The chewing gum of claim 1, wherein the chewing gum additionally comprises other traditionally used bulking agents in amounts that do not cause the chewing gum to lose its cud-forming, elastic, chewable quality or cause the chewing gum to disintegrate under mouth conditions.

9. The chewing gum of claim 8, wherein the other traditionally used bulking agents are selected from the group consisting of isomalt, maltitol, xylitol, lactitol, sorbitol, and mixtures thereof.

10. The chewing gum of claim 1, wherein the ratio of bulking agent to cross-linked gelatin matrix gum base is less than or equal to 9:1.

11. The chewing gum of claim 1, wherein the cross-linked gelatin matrix gum base has a water content of between 15% and 35% by weight.

12. The chewing gum of claim 1, wherein the cross-linked gelatin matrix gum base is comprised of a polyphenol and a gelatin in a polyphenol to gelatin ratio of 0.3:1 to 1:1.

13. The chewing gum of claim 1, wherein the chewing gum comprises 0.1 to 5% by weight of a flavor.

14. The chewing gum of claim 1, wherein the chewing gum comprises a water soluble portion consisting of mannitol, erythritol, and optionally, at least one additional ingredient selected from the group consisting of a color, an antioxidant, an emulsifier, a flavor, a plasticizing agent, a high-intensity sweetener, an acidulant, a sensate, an antimicrobial, and combinations thereof.

15. The chewing gum of claim 14, wherein the water soluble portion consists of mannitol and erythritol.

16. The chewing gum of claim 1, wherein the bulking agent consists of mannitol and erythritol.

17. The chewing gum of claim 1, wherein the cross-linked gelatin matrix gum base has a water content from about 25% to 35% by weight.

18. A method of making a chewing gum comprising the steps of:
   a. Mixing a polyphenol with water to form a polyphenol solution, and mixing the polyphenol solution with dry gelatin to make a cross-linked gelatin matrix gum base;
   b. Mixing the cross-linked gelatin matrix gum base with a bulking agent comprising mannitol and erythritol to make a cudforming, elastic, chewable chewing gum that does not disintegrate under mouth conditions, wherein said chewing gum comprises polyols other than mannitol and erythritol in a weight ratio of the other polyols to cross-linked gelatin matrix gum base of 0.15:1 or less, and wherein the chewing gum comprises 20 to 35% by weight cross-linked gelatin matrix gum base, 20 to 35% by weight erythritol and 25 to 40% by weight mannitol with all weights based on the weight of the chewing gum.

19. The method of claim 18 additionally comprising the step of: mixing at least one elastomer, elastomer solvent, softener, plastic resin, filler, color, antioxidant, emulsifier, plasticizing agent, antimicrobial, or combinations thereof with the cross-linked gelatin matrix gum base to form an insoluble portion of the chewing gum.

20. The method of claim 18 or 19 additionally comprising the step of: mixing at least one softener, color, antioxidant, emulsifier, flavor, plasticizing agent, sweetener, acidulant, sensate, antimicrobial, or combinations thereof with the bulking agent to form a soluble portion of the chewing gum.

21. The method of claim 18 wherein step a) is conducted at a processing temperature of 28 to 90° C.

22. The method of claim 21, wherein the processing temperature is 35 to 55° C.

* * * * *